(12) United States Patent
Hovis et al.

(10) Patent No.: US 10,345,179 B2
(45) Date of Patent: Jul. 9, 2019

(54) PASSIVE STRAIN INDICATOR (71) Applicant: General Electric Company, Schenectady, NY (US)

(72) Inventors: Gregory Lee Hovis, Martinez, GA (US); William F. Ranson, Columbia, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/432,148

(22) Filed: Feb. 14, 2017

(65) Prior Publication Data
US 2018/0231428 A1     Aug. 16, 2018

(51) Int. Cl.
| | |
|---|---|
| *G01L 19/08* | (2006.01) |
| *F01D 17/04* | (2006.01) |
| *G01M 5/00* | (2006.01) |
| *G01B 11/16* | (2006.01) |
| *G01B 5/30* | (2006.01) |

(52) U.S. Cl.
CPC .............. *G01L 19/08* (2013.01); *F01D 17/04* (2013.01); *G01B 5/30* (2013.01); *G01B 11/16* (2013.01); *G01M 5/0016* (2013.01); *F05D 2260/80* (2013.01)

(58) Field of Classification Search
CPC ................................. G01L 19/08; F01D 17/04
See application file for complete search history.

(56) References Cited

U.S. PATENT DOCUMENTS

| | | |
|---|---|---|
| 4,528,856 A | 7/1985 | Junker et al. |
| 4,746,858 A | 5/1988 | Metala et al. |
| 4,782,705 A | 11/1988 | Hoffmann et al. |
| 4,859,062 A | 8/1989 | Thurn et al. |
| 4,939,368 A | 7/1990 | Brown |

(Continued)

FOREIGN PATENT DOCUMENTS

| | | |
|---|---|---|
| EP | 0 455 823 A1 | 11/1991 |
| JP | 2009-47501 A | 3/2009 |
| WO | WO 2014/031957 | 2/2014 |

OTHER PUBLICATIONS

Extended European Search Report and Opinion issued in connection with corresponding EP Application No. 18155201.9 dated Jul. 4, 2018.

*Primary Examiner* — Jamel E Williams
(74) *Attorney, Agent, or Firm* — Frank A. Landgraff (57) ABSTRACT

A method of making a component with a passive strain indicator includes forming the component including an outer surface thereof. The passive strain indicator includes a shim with a plurality of fiducial markers. The method also includes forming the plurality of fiducial markers on the shim by deforming selected locations on the shim. The method further includes attaching a portion of the shim to the outer surface of the component. Forming the component and forming the passive strain indicator are performed separately prior to attaching the shim to the outer surface of the component. A system for monitoring strain includes a component and a passive strain indicator. A portion of the passive strain indicator is integrally joined with the outer surface of the component. The passive strain indicator includes a shim and a plurality of fiducial markers. Each fiducial marker is a discrete three-dimensional feature on the shim.

25 Claims, 6 Drawing Sheets

(56) References Cited

U.S. PATENT DOCUMENTS

| | | | |
|---|---|---|---|
| 6,078,396 | A | 6/2000 | Manzouri |
| 6,175,644 | B1 | 1/2001 | Scola et al. |
| 6,574,363 | B1 | 6/2003 | Classen et al. |
| 6,983,659 | B2 | 1/2006 | Soechting et al. |
| 6,986,287 | B1 | 1/2006 | Dorfman |
| 7,200,259 | B1 | 4/2007 | Gold et al. |
| 7,227,648 | B2 | 6/2007 | Weinhold |
| 7,414,732 | B2 | 8/2008 | Maidhof et al. |
| 7,421,370 | B2 | 9/2008 | Jain et al. |
| 7,441,464 | B2 | 10/2008 | Turnbull et al. |
| 7,477,995 | B2 | 1/2009 | Hovis et al. |
| 7,490,522 | B2 | 2/2009 | Ruehrig et al. |
| 7,533,818 | B2 * | 5/2009 | Hovis .................. G01B 11/165 235/462.09 |
| 7,689,003 | B2 | 3/2010 | Shannon et al. |
| 7,697,966 | B2 | 4/2010 | Monfre et al. |
| 7,849,752 | B2 | 12/2010 | Gregory et al. |
| 8,245,578 | B2 | 8/2012 | Ranson et al. |
| 8,307,315 | B2 | 11/2012 | Ranson |
| 8,511,182 | B2 | 8/2013 | Bjerge et al. |
| 8,600,147 | B2 | 12/2013 | Iliopoulos et al. |
| 8,818,078 | B2 | 8/2014 | Telfer et al. |
| 8,994,845 | B2 | 3/2015 | Mankowski |
| 9,128,063 | B2 | 9/2015 | Dooley |
| 9,200,889 | B2 | 12/2015 | Swiergiel et al. |
| 9,207,154 | B2 | 12/2015 | Harding et al. |
| 9,311,566 | B2 | 4/2016 | Iliopoulos et al. |
| 9,316,571 | B2 | 4/2016 | Müller et al. |
| 2009/0311615 | A1 * | 12/2009 | Tang ........................ G03F 1/76 430/30 |
| 2013/0013224 | A1 | 6/2013 | Ito et al. |
| 2013/0194567 | A1 | 8/2013 | Wan et al. |
| 2014/0000380 | A1 | 1/2014 | Slowik et al. |
| 2014/0149296 | A1 * | 5/2014 | Chang ................... G06Q 10/20 705/305 |
| 2014/0267677 | A1 | 9/2014 | Ward, Jr. et al. |
| 2015/0239043 | A1 | 8/2015 | Shipper, Jr. et al. |
| 2015/0346057 | A1 | 12/2015 | Ward, Jr. et al. |
| 2016/0161242 | A1 | 6/2016 | Cook et al. |
| 2016/0313114 | A1 | 10/2016 | Tohme et al. |
| 2016/0354174 | A1 | 12/2016 | Demir |

* cited by examiner

PASSIVE STRAIN INDICATOR

FIELD

The present disclosure relates generally to methods for making components having passive strain indicators and systems for monitoring strain, and in particular passive strain indicators which may be formed separately from the component and joined to the component.

BACKGROUND

Throughout various industrial applications, apparatus components are subjected to numerous extreme conditions (e.g., high temperatures, high pressures, large stress loads, etc.). Over time, an apparatus's individual components may suffer creep and/or deformation that may reduce the component's usable life. Such concerns might apply, for instance, to some turbomachines.

Turbomachines are widely utilized in fields such as power generation and aircraft engines. For example, a conventional gas turbine system includes a compressor section, a combustor section, and at least one turbine section. The compressor section is configured to compress a working fluid (e.g., air) as the working fluid flows through the compressor section. The compressor section supplies a high pressure compressed working fluid to the combustors where the high pressure working fluid is mixed with a fuel and burned in a combustion chamber to generate combustion gases having a high temperature and pressure. The combustion gases flow along a hot gas path into the turbine section. The turbine section utilizes the combustion gases by extracting energy therefrom to produce work. For example, expansion of the combustion gases in the turbine section may rotate a shaft to power the compressor, an electrical generator, and other various loads.

During operation of a turbomachine, various components within the turbomachine, and particularly components along the hot gas path such as turbine blades within the turbine section of the turbomachine, may be subject to deformation due to high temperatures and stresses. For example, in turbine blades, creep may cause portions of or the entire blade to elongate so that the blade tips contact a stationary structure, for example a turbine casing, and potentially cause unwanted vibrations and/or reduced performance during operation.

BRIEF DESCRIPTION

Aspects and advantages of the invention will be set forth in part in the following description, or may be obvious from the description, or may be learned through practice of the invention.

In accordance with one embodiment of the present disclosure, a method of making a component with a passive strain indicator is provided. The passive strain indicator includes a shim with a plurality of fiducial markers thereon. The method includes forming the component, the component including an outer surface. The method further includes forming a plurality of fiducial markers on the shim by deforming selected locations on the shim, and attaching at least a portion of the shim to the outer surface of the component. The component and the passive strain indicator are formed separately prior to attaching at least a portion of the shim to the outer surface of the component.

In accordance with another embodiment of the present disclosure, a system for monitoring strain is provided. The system includes a component having an outer surface. The system further includes a passive strain indicator. At least a portion of the passive strain indicator is integrally joined with the outer surface of the component. The passive strain indicator includes a shim and a plurality of fiducial markers. Each fiducial marker includes a discrete three-dimensional feature on the shim.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment.

Thus, it is intended that the present invention covers such modifications and variations as come within the scope of the appended claims and their equivalents.

Figure 1:
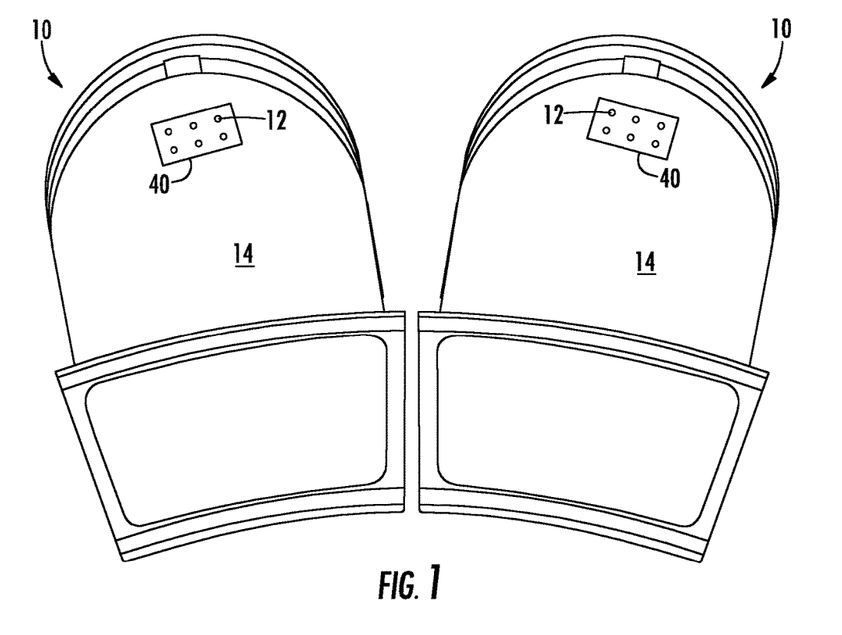
FIG. 1 is a perspective view of an exemplary component with a passive strain indicator thereon in accordance with embodiments of the present disclosure.
Figure 2:
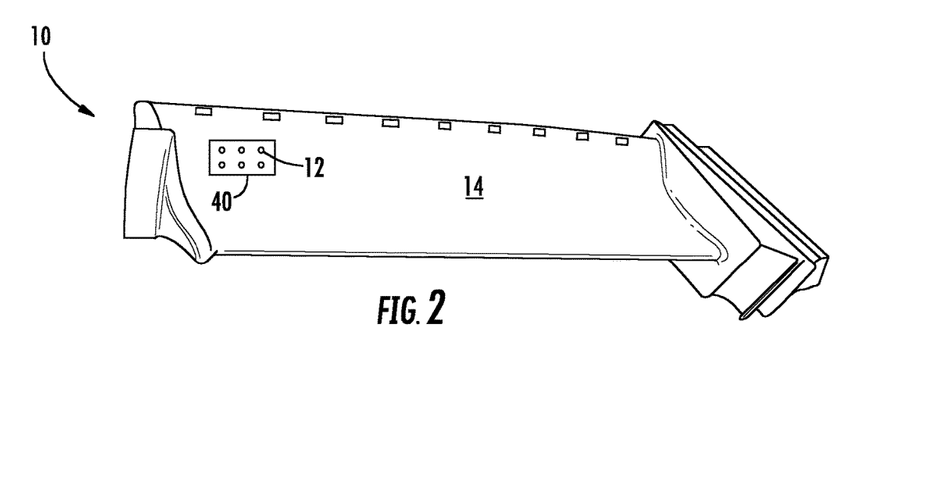
FIG. 2 is a perspective view of another exemplary component with a passive strain indicator thereon in accordance with embodiments of the present disclosure.
Figure 3:
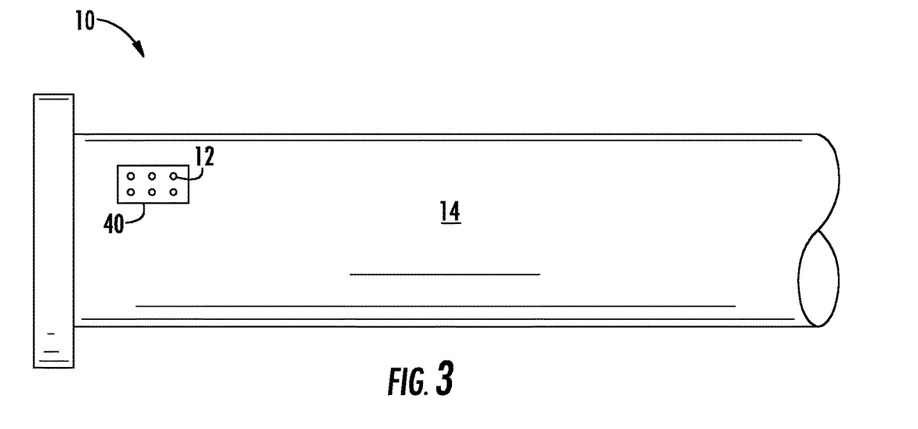
FIG. 3 is a side view of yet another exemplary component with a passive strain indicator thereon in accordance with embodiments of the present disclosure.

Referring to FIGS. 1 through 3, exemplary components 10 are illustrated with a passive strain indicator 40 attached to an outer surface 14 of each component 10. The passive strain indicator 40 includes a plurality of fiducial markers 12 formed thereon. The component 10 can be any of a variety of types of components used in a variety of different applications, such as, for example, components utilized in high temperature applications (e.g., components comprising nickel or cobalt based superalloys). In some embodiments, the component 10 may be an industrial gas turbine or steam turbine component such as a combustion component or hot gas path component. In some embodiments, the component 10 may be a turbine blade, compressor blade, vane, nozzle, shroud, rotor, transition piece or casing. In other embodiments, the component 10 may be any other component of a turbine such as any other component for a gas turbine, steam turbine or the like. In some embodiments, the component may be a non-turbine component including, but not limited to, automotive components (e.g., cars, trucks, etc.), aerospace components (e.g., airplanes, helicopters, space shuttles, aluminum parts, etc.), locomotive or rail components (e.g., trains, train tracks, etc.), structural, infrastructure or civil engineering components (e.g., bridges, buildings, construction equipment, etc.), and/or power plant or chemical processing components (e.g., pipes used in high temperature applications).

The example component 10 shown in the illustrative embodiment of FIG. 1 is a turbine component, and more specifically a transition piece. As illustrated in FIG. 1, the component 10 may be one of a set, e.g., two or more, of components 10, and in some embodiments each component 10 of the set may include a passive strain indicator 40 thereon, while in other embodiments, less than all of the components 10 in a set may have a passive strain indicator 40 thereon. The example component 10 shown in the illustrative embodiment of FIG. 2 is a turbine component, and more specifically a turbine blade. The example component 10 shown in the illustrative embodiment of FIG. 3 is a pressure vessel, and more specifically a pipe, such as may be sealingly connected to a boiler or other high pressure and/or high temperature vessel. Similarly as noted above regarding FIG. 1, the pipe 10 of FIG. 3 may be part of a set, e.g., including multiple pipes and/or a vessel to which the illustrated pipe 10 is connected, and some or all of the elements of that set may also include passive strain indicators 40 thereon. Further, the component 10 can be various additional or alternative components, as described above.

As illustrated for example in FIGS. 4-7, the passive strain indicator 40 includes a shim 38 with a plurality of fiducial markers 12 formed on the shim 38. The fiducial markers 12 are positioned on a portion 18 of a front surface 17 of the shim 38. The fiducial markers 12 are generally identifiable targets, each having a length L and width W (see FIG. 9). As discussed herein, fiducial markers 12 in accordance with the present disclosure are discrete three-dimensional features, e.g., depressions or indentations defined in the shim 38. Accordingly, the fiducial markers 12 may each further have a depth D (see FIGS. 6 and 7) extending into the shim 38, and shim 38 may be attached to component 10.

In some embodiments, such as when the component 10 is a turbine blade or other turbine component, suitable materials for the component 10 may include high performance nickel-based superalloys such as GTD-111, GTD-141, GTD-444, R108, INCONEL 738, or single crystal N4 and N5. In some embodiments, suitable materials for the shim 38 include HASTELLOY X, 302 Stainless Steel, 6Al/4V Titanium, and INCONEL. Alternatively, other suitable metals or other materials may be utilized for the component 10 and/or the shim 38.

Figure 4:
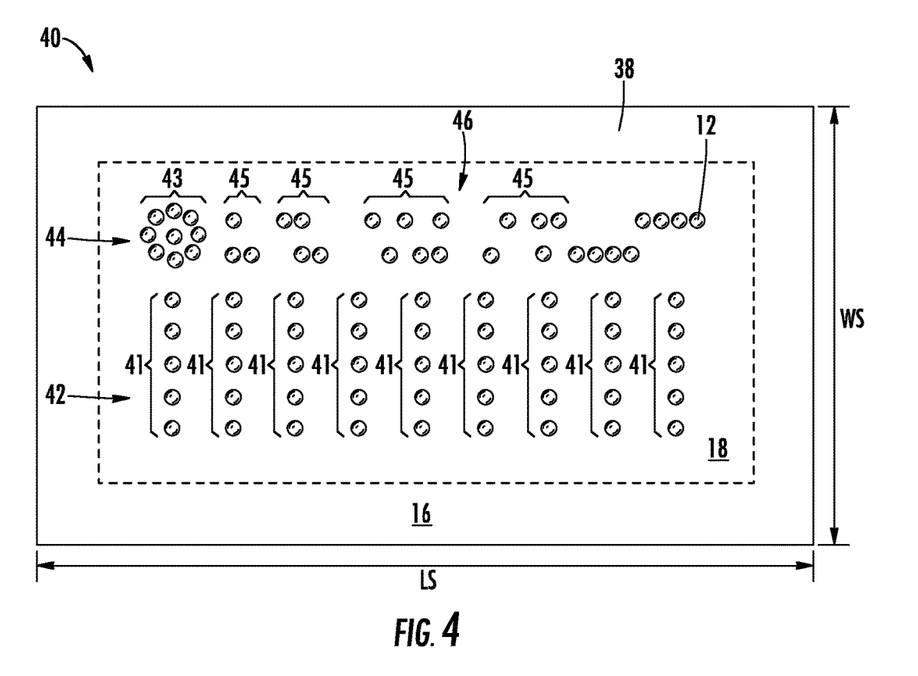
FIG. 4 is an overhead view of a plurality of fiducial markers in accordance with embodiments of the present disclosure.

The fiducial markers 12 may each have a maximum diameter MD (FIG. 4). In various exemplary embodiments, the maximum diameter MD of the markers 12 may be between one hundredth of an inch (0.01") and fifteen hundredths of an inch (0.15"), such as between two hundredths of an inch (0.02") and twelve hundredths of an inch (0.12"). In some exemplary embodiments, the maximum diameter MD of the markers 12 may be between fifteen thousandths of an inch (0.015") and three hundredths of an inch (0.03"). It should be understood that the maximum diameter MD of one fiducial marker 12 may differ from that of other fiducial markers 12, e.g., the maximum diameters MD may all be within the same range but not necessarily equal to one another.

Figure 9:
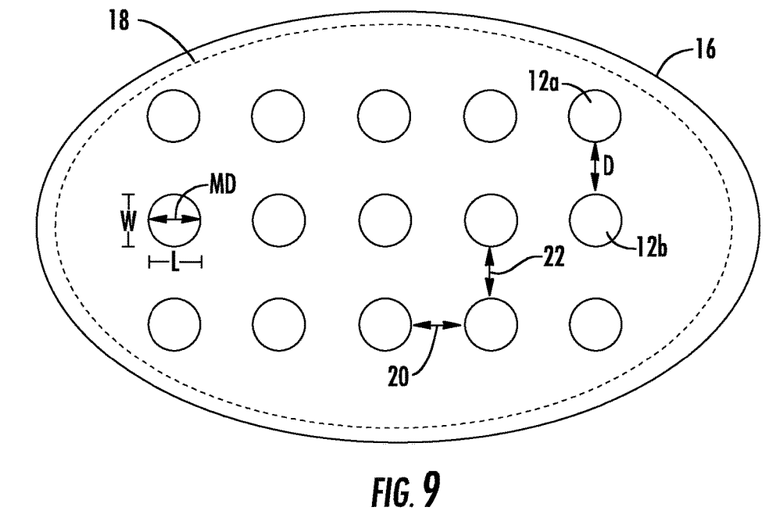
FIG. 9 is an overhead view of a plurality of fiducial markers in accordance with embodiments of the present disclosure.

Referring now to FIGS. 1 through 3, the passive strain indicator 40 may be positioned on the outer surface 14 of the component 10. In some embodiments, the passive strain indicator 40 may be attached to the outer surface 14, and in some embodiments may be integrally joined to the outer surface 14 such as by welding. In exemplary embodiments, at least two discrete markers (e.g., 12a and 12b, as shown in FIG. 9) are provided, such that a distance D can be measured between said at least two markers 12a and 12b. As should be appreciated by those skilled in the art, these measurements can help determine the amount of strain, strain rate, creep, fatigue, stress, etc. at the region of the component 10 upon which the passive strain indicator 40 is located. The passive strain indicator 40 can be of various sizes and the at least two discrete markers 12a and 12b thereon can be disposed at a variety of distances and the passive strain indicator 40 can be positioned in a variety of locations on the component 10 depending on the specific component 10, so long as the distance D between the markers can be measured.

Figure 6:
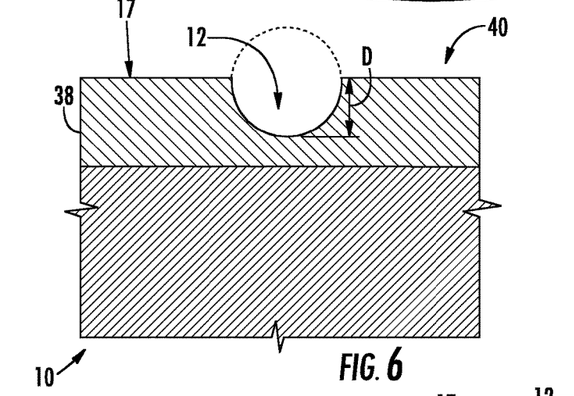
FIG. 6 is a partial section view of a passive strain indicator on a component in accordance with embodiments of the present disclosure.
Figure 7:
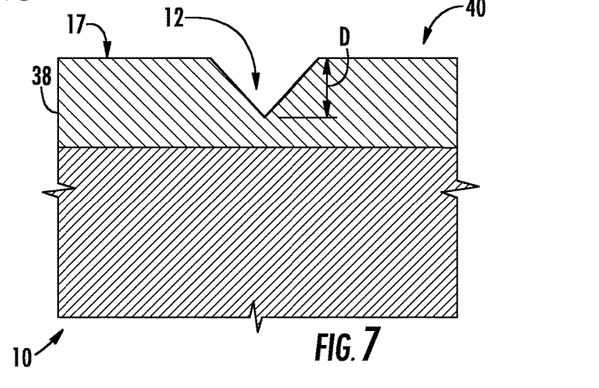
FIG. 7 is a partial section view of a passive strain indicator on a component in accordance with embodiments of the present disclosure.

The fiducial markers 12 may have any suitable shapes, such as dots, lines, circles, rectangles or any other geometrical or non-geometrical shape, so long as they are consistently identifiable and may be used to measure the distance D therebetween. The fiducial markers 12 may form a variety of different configurations and cross-sections such as by incorporating a variety of differently shaped, sized, and positioned fiducial markers 12. For instance, each fiducial marker 12 may include a matched or unique shape. In some embodiments, each marker 12 may define a circular shape, rectangular shape, or linear shape that is the same as (i.e., matched) or unique from another fiducial marker. One possible shape is shown in FIG. 6, wherein an example fiducial marker 12 is illustrated which defines a portion of a sphere, e.g., the fiducial marker 12 may have a hemispherical shape, with the remainder of the sphere illustrated in dashed lines in FIG. 6 for reference. Some embodiments may include monitoring strain based on analysis of the full sphere which is partially defined by the hemispherical fiducial marker 12. Another example is illustrated in FIG. 7, wherein the fiducial marker 12 has a conical shape. For instance, in embodiments where the plurality of fiducial markers 12 are formed by dot peening, the dot peening apparatus may include a stylus with a conical point which leaves a correspondingly shaped impression in the shim, e.g., a conical fiducial marker 12 as illustrated in FIG. 7. As noted above, the fiducial markers 12 may have any suitable shape, so long as they are consistently identifiable and may be used to measure the distance D therebetween.

As discussed, the fiducial markers 12 are depressions or indentations defined in the shim 38. Various suitable methods may be utilized for forming the fiducial markers 12 in the shim 38. For example, in some embodiments, the fiducial markers 12 may be formed during formation of the shim 38, which may be formed for example using suitable casting or molding processes or other suitable manufacturing processes. Alternatively, the fiducial markers 12 may be formed after formation of the shim 38, using suitable subtractive techniques. Examples of such techniques include laser removal, etching, etc. In another example, the fiducial markers 12 may be formed after formation of the shim 38 by mechanically deforming selected locations on the shim 38 using any suitable technique, such as dot peening.

Any suitable means or method of attaching the passive strain indicator 40 to the component 10 may be used. In some embodiments, at least a portion of the passive strain indicator 40 may be integrally joined with the component 10, which may advantageously reduce or minimize movements of the passive strain indicator 40 and the fiducial markers 12 independent or in excess of the component 10. For example, the passive strain indicator 40 may be integrally joined to the component 10 by welding the shim 38 to the component 10. For example, in some embodiments, a portion of the shim 38 may be spot welded to the outer surface 14 of the component 10. Any other suitable method of integrally joining the passive strain indicator 40 to the component 10 may be used, where such methods result in at least a portion of the passive strain indicator 40 unified with the component 10 and the passive strain indicator 40 cannot be removed from the component 10 without damaging one or both of the component 10 and the passive strain indicator 40.

In some embodiments, as discussed above, the shim 38 includes a front surface 17 (FIGS. 6 and 7) on which the fiducial markers 12 are formed. In some embodiments, the front surface 17 may include a reference portion 18 (FIG. 4) whereupon the fiducial markers 12 are formed and a peripheral attachment region 16 surrounding the reference portion 18. In embodiments where the shim 38 is welded to the outer surface 14, the peripheral attachment region 16 comprises a peripheral welding region. It should be understood that descriptions herein of peripheral welding region 16 are describing an example embodiment of the peripheral attachment region 16 and are not necessarily limited to welding. The peripheral welding region 16 may be distinct from the reference portion 18. For example, peripheral welding region 16 may be distinct from the reference portion 18 in that the plurality of fiducial markers 12 may be positioned on the reference portion 18 of the front surface 17, whereas there may be no fiducial makers 12 positioned on the peripheral welding region 16 of the front surface 17. As another example, peripheral region 16 may be distinct from the reference portion 18 in that the shim 38 may be attached to the outer surface 14 of the component 10 only at peripheral attachment region 16, e.g., embodiments wherein the shim 38 is attached to the outer surface 14 by welding may include spot welding only the peripheral welding region 16 of the shim 38 to the outer surface 14 of the component 10.

Figure 8:
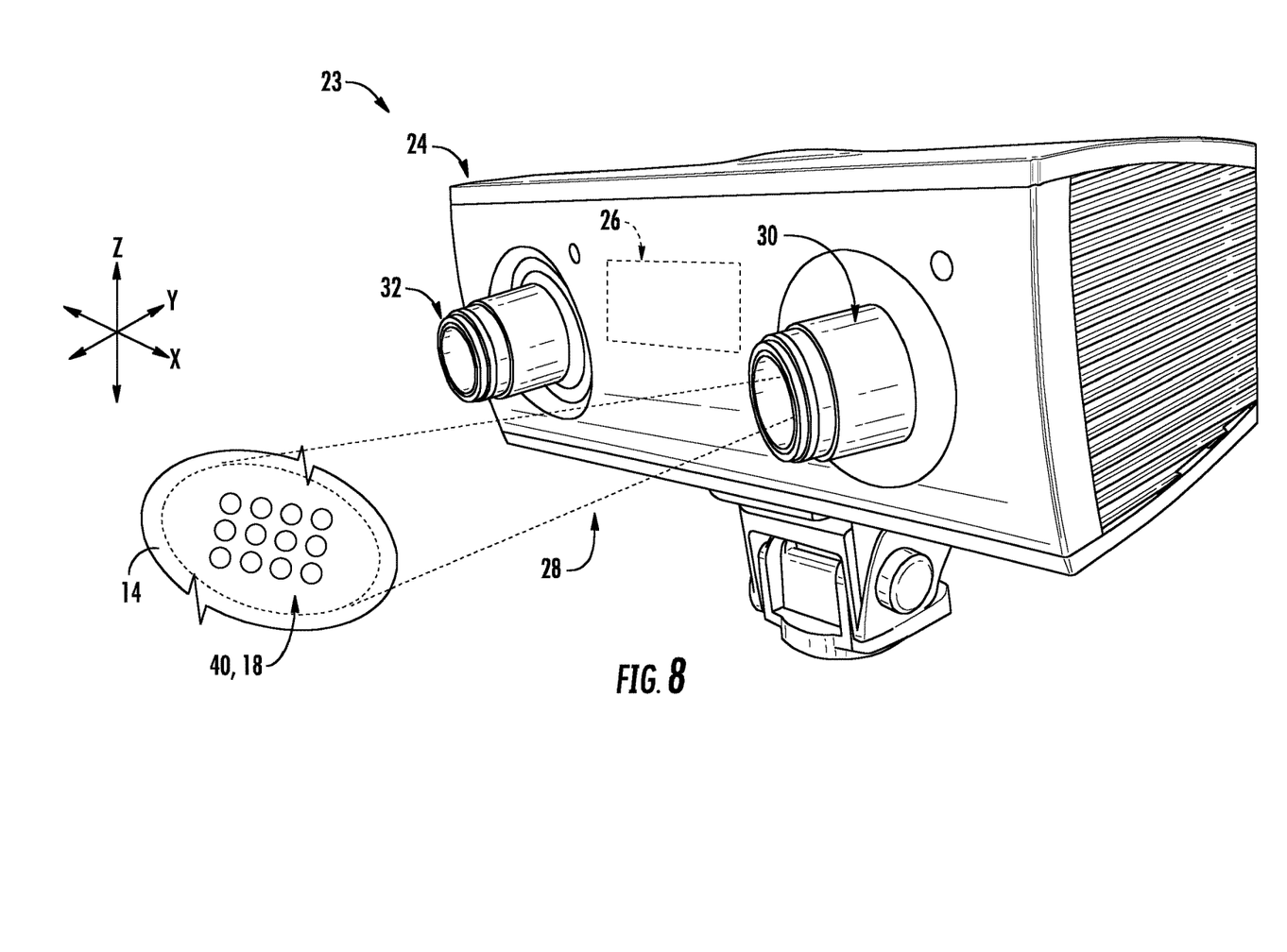
FIG. 8 is a perspective view of a system for monitoring component strain in accordance with embodiments of the present disclosure.

As discussed in more detail below, various embodiments include directly measuring the plurality of fiducial markers 12 using a three-dimensional data acquisition device, such as with an optical scanner 24 (FIG. 8). The optical scanner 24 or other suitable device may, in some embodiments, have a field of view, i.e., a maximum areal extent that the device can capture in a single image or pass. In such embodiments, the area of the reference portion 18 may preferably be at least one-third (⅓) of the area of the field of view. For example, as will be discussed in more detail below, in some example embodiments, the optical scanner 24 may be a structured light scanner. Further, in such embodiments, the field of view of scanner 24 or other suitable device may provide an upper limit on the size of reference portion 18, e.g., reference portion 18 may be sized such that all of the plurality of fiducial markers 12 can fit within the field of view.

The passive strain indicator 40 may be attached to various components 10 and in one or more of a variety of locations on such components 10. For example, as discussed above, the passive strain indicator 40 may be positioned on a turbine blade, vane, nozzle, shroud, rotor, transition piece or casing. In such embodiments, the passive strain indicator 40 may be attached to the component 10 in one or more locations known to experience various forces during unit operation such as on or proximate airfoils, platforms, tips or any other suitable location, which may include a life-limiting region of the component 10, e.g., a high stress or high strain region and/or a region with close tolerances or clearances. For example, the passive strain indicator 40 may be attached in one or more locations known to experience elevated temperatures or concentrated structural load. For example the passive strain indicator 40 may be positioned in a hot gas path and/or on a combustion component 10, such as the transition piece of FIG. 1 or the turbine blade of FIG. 2.

The passive strain indicator 40 may comprise a variety of different configurations and cross-sections such as by incorporating a variety of differently shaped, sized, and positioned fiducial markers 12. For example, the strain indicator 40 may comprise a variety of different fiducial markers 12 comprising various shapes and sizes. Such embodiments may provide for a greater variety of distance measurements 48. The greater variety may further provide a more robust strain analysis on a particular portion of the component 10 by providing strain measurements across a greater variety of locations.

Furthermore, the values of various dimensions of the passive strain indicator 40 may depend on, for example, the component 10, the location of the passive strain indicator 40, the targeted precision of the measurement, application technique, and optical measurement technique. For example, in some embodiments, the shim 38 may comprise a length LS and a width WS. The product of the length LS and the width WS may define an area of the shim 38, and in particular an area of the front surface 17 thereof. The width WS may range from less than one tenth of an inch (0.1") to greater than three quarters of an inch (0.75"), such as between two-tenths of an inch (0.2") and half an inch (0.5"). The length LS may range from less than two tenths of an inch (0.2") to greater than one and a half inches (1.5"), such as between four tenths of an inch (0.4") and one inch (1.0"). Moreover, the passive strain indicator 40 may comprise any thickness that is suitable for application and subsequent optical identification without significantly impacting the performance of the underlying component 10. For example, in some embodiments, the strain sensor 40 may comprise a thickness of between one thousandth of an inch (0.001") and thirty thousands of an inch (0.030"), such as between three thousandths of an inch (0.003") and twenty-five thousandths of an inch (0.025"), such as between six thousandths of an inch (0.006") and twenty thousandths of an inch (0.020"), such as between eight thousandths of an inch (0.008") and fifteen thousandths of an inch (0.015"). In some embodiments, the shim 38 may have a substantially uniform thickness. Such embodiments may help facilitate more accurate measurements for subsequent strain calculations.

The area of the front surface 17 may include peripheral attachment region 16 and reference portion 18, and may include other portions, e.g., the front surface 17 may include a buffer zone or clearance between the reference portion 18 and the peripheral attachment region 16. In other embodiments, the area of the front surface 17 may be entirely occupied by the reference portion 18 and the peripheral attachment region 16. Thus, in some embodiments, the reference portion 18 may occupy between about forty percent of the area of the front surface and about seventy percent of the area of the front surface, while the peripheral attachment region 16 may occupy the remainder of the front surface 17, e.g., between about thirty percent of the area of the front surface 17 and about sixty percent of the area of the front surface 17. In other embodiments, the peripheral attachment region 16 and the reference portion 18 may collectively occupy less than all of the front surface 17, e.g., the reference portion 18 may occupy about sixty percent of the area of the front surface 17 and the peripheral attachment region 16 may occupy about thirty percent of the area of the front surface 17, with the remainder of the front surface 17 forming a buffer zone with no fiducial markers 12 formed therein and which is not welded or otherwise directly attached to the component 10. Various other proportions and combinations of the reference portion 18 and the peripheral attachment region 16 are also possible.

The plurality of fiducial markers 12 may be disposed on front surface 17 of the shim 38 in any suitable number and arrangement. Providing at least four fiducial markers 12 may advantageously permit measurement and analysis of full strain components, i.e., all three strain components. For example, providing at least four fiducial markers 12 may advantageously permit a 2D strain field measurement and analysis, and providing at least seven fiducial markers 12 may advantageously permit a 3D strain field measurement and analysis. The fiducial markers 12 may in various exemplary embodiments be arranged along a regular grid, e.g., such that the markers 12 define a rectangular shape. In at least one alternative embodiment, the fiducial markers 12 may be arranged in a linear fashion or other regular pattern. In other alternative embodiments, the fiducial markers 12 may be arranged in a non-linear pattern and/or may define an irregular shape. Various combinations of such embodiments are possible, e.g., four markers may be provided and arranged to form a rectangle or a straight line, or four fiducial markers may be provided in a non-linear pattern. Such examples are for illustration purposes only and not limitation. Any suitable number and arrangement of fiducial markers 12 may be provided in various embodiments.

Optionally, the fiducial markers 12 may be positioned in a predetermined reference pattern. For example, the fiducial markers 12 may be arranged as matrix grid across the reference portion 18, as illustrated in FIG. 9. The matrix grid may include a preselected column spacing 20 and a preselected row spacing 22 to define the distance D between each adjacent marker 12. Moreover, multiple passive strain indicators may each include individualized predetermined reference patterns. In other words, the predetermined reference pattern of one passive strain indicator 40 may be distinguishable and different from the predetermined reference pattern of another passive strain indicator 40. Placing passive strain indicators each having an individualized predetermined reference pattern on discrete components or discrete portions of the same component may allow the discrete components and/or portions to be identified and tracked throughout the life of the component 10.

In some embodiments, as mentioned above, the fiducial markers 12 may be arranged in a matrix grid, the matrix grid having preselected column spacing 20 and preselected row spacing 22, across the reference portion 18. Further, such embodiments may include relatively small preselected column spacing 20 and/or preselected row spacing 22 as compared to the size of the fiducial markers 12. For example, one of the preselected row spacing 20 or the preselected column 22 spacing may be less than about seventy-five percent (75%) of the maximum diameter MD of the fiducial markers 12, such as less than about sixty percent (60%) of the maximum diameter MD. Additionally, it should be appreciated that as used herein, terms of approximation, such as "about" or "approximately," refer to being within ten percent above or below a stated value.

Figure 5:
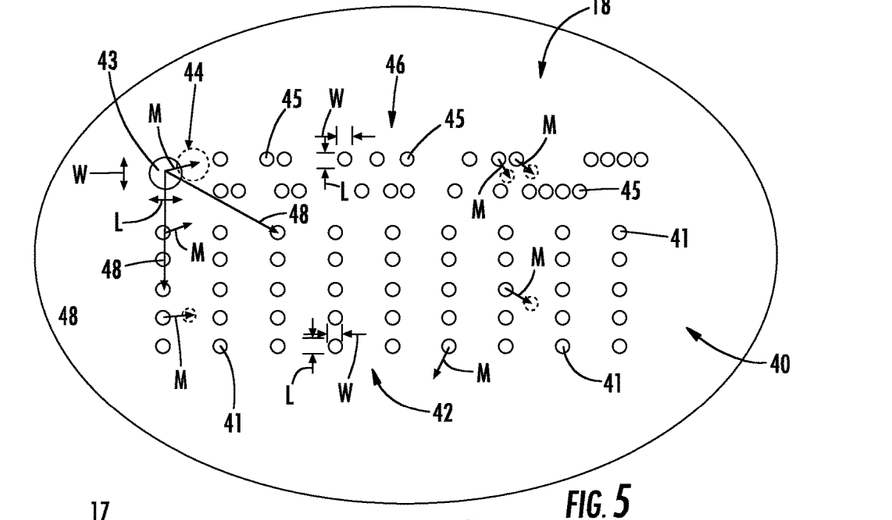
FIG. 5 is an overhead view of a plurality of fiducial markers in accordance with embodiments of the present disclosure.

In some embodiments, the fiducial markers 12 may be arranged in a predetermined pattern which includes binary-encoded data, such as a bar code or QR code. In some embodiments, e.g., as illustrated in FIGS. 4 and 5, the predetermined pattern may include an analysis region 42, a locator region 44, and a serial region 46, with at least one of the plurality of fiducial markers 12 formed in each of the analysis region 42, the locator region 44, and the serial region 46. Each fiducial marker 12 of passive strain indicator 40 may, for example, be provided and utilized as an analysis feature 41, a locator feature 43, or a serial feature 45. Analysis features 41 may be disposed within analysis region 42, locator features 43 may be disposed within locator region 44, and serial features 45 may be disposed within serial region 46 of the passive strain indicator 40. Generally, a locator feature 43 is utilized as a reference point for the measurement of distances 48 between the locator feature 43 and various analysis features 41. The measurements may be taken at a plurality of different times, e.g., before and after deformation events such as creep, fatigue, and overloads. As should be appreciated to those skilled in the art, these measurements can help determine the amount of strain, strain rate, creep, fatigue, stress, etc. at the region of the component 10 upon which the passive strain indicator 40 is positioned. The fiducial markers 12 generally can be disposed at a variety of distances and in a variety of locations depending on the specific component 10 so long as the distances 48 can be measured. Moreover, the fiducial markers 12 may comprise dots, lines, circles, boxes or any other geometrical or non-geometrical shape so long as they are consistently identifiable and may be used to measure distances 48.

As discussed, in some embodiments, a passive strain indicator 40 may include a serial region 46 which may include a plurality of serial features 45. These features 45 may generally form any type of barcode, label, tag, serial number, pattern or other identifying system that facilitates the identification of that particular passive strain indicator 40. In some embodiments, the serial region 46 may additionally or alternatively comprise information about the component 10 or the overall assembly that the component 10 is configured on. The serial region 46 may thereby assist in the identification and tracking of particular passive strain indicator 40, components 10 or even overall assemblies to help correlate measurements for past, present and future operational tracking.

Figure 10:
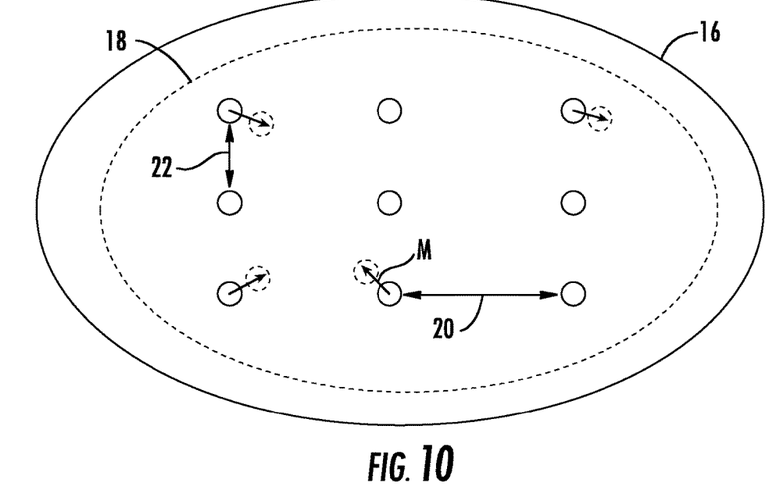
FIG. 10 is an overhead view of a plurality of fiducial markers in accordance with embodiments of the present disclosure.

Referring now to FIG. 8, an exemplary embodiment of a system for monitoring component strain is illustrated. Such systems in accordance with the present disclosure may facilitate improved local and/or global strain analysis by measuring fiducial markers 12 along three axes (conventionally termed as an X-axis, Y-axis and Z-axis and which are mutually orthogonal). Movements M (FIGS. 5 and 10) of the fiducial markers 12 may be tracked in each plane as the system 23 measures the relative displacement of each marker, and thereby the deformation of the component 10. Further, system 23 may include a three-dimensional data acquisition device 24, such as in exemplary embodiments an optical scanner 24 (FIG. 8), for analyzing the fiducial markers 12, and a processor 26 in operative communication with the three-dimensional data acquisition device.

In general, as used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. The processor 26 may also include various input/output channels for receiving inputs from and sending control signals to various other components with which the processor 26 is in communication, such as the three-dimensional data acquisition device 24. The processor 26 may further include suitable hardware and/or software for storing and analyzing inputs and data from the three-dimensional data acquisition device 24, and for generally performing method steps as described herein.

Notably, processor 26 (or components thereof) may be integrated within the optical data acquisition device 24. In additional or alternative embodiments, the processor 26 (or components thereof) may be separate from the data acquisition device 24. In exemplary embodiments, for example, processor 26 includes components that are integrated within the data acquisition device 24 for initially processing data received by the data acquisition device 24, and components that are separate from the data acquisition device 24 for measuring the fiducial markers 12 and/or assembling contemporary three-dimensional profiles from the data and comparing these profiles.

In general, processor 26 is operable for directly measuring the fiducial markers 12 along an X-axis, a Y-axis and a Z-axis to obtain X-axis data points, Y-axis data points, and Z-axis data points and create accurate 3D digital replications of the topology of front surface 17, and in particular, of reference portion 18 thereof. As discussed, the axes are mutually orthogonal. The X-axis data points, Y-axis data points, and Z-axis data points are dimensional data points related to the direct measurement of the fiducial markers 12. Processor 26 may further be operable for locating a centroid of each fiducial marker 12, e.g., determining three-dimensional coordinates representing the location of the centroid. By scanning the passive strain indicator 40 on component 10 at various times, e.g., before and after deformation events such as creep, fatigue, and overloads, the component 10 may be monitored for, e.g. stress and/or strain. The data acquisition device 24 may be operable to perform a single three-dimensional measurement of the component 10 such that a composite measurement is not required or performed. The single three-dimensional measurement of the component 10 produces three-dimensional data and permits three-dimensional strain analysis. Exemplary embodiments of such three-dimensional data may include polygon mesh data within three-dimensional point clouds, including centroid coordinates in a three-dimensional space defined by the mutually orthogonal axes X, Y, and Z. Such three-dimensional data may then be input to deformation analysis algorithms to calculate regional surface strain.

In general, any suitable three-dimensional data acquisition device 24 which utilizes surface metrology techniques to obtain direct measurements in three dimensions may be utilized. In exemplary embodiments, device 24 is a non-contact device which utilizes non-contact surface metrology techniques. Further, in exemplary embodiments, a device 24 in accordance with the present disclosure has a resolution along the X-axis, the Y-axis and the Z-axis of between approximately 100 nanometers and approximately 100 micrometers. Accordingly, and in accordance with exemplary methods, the X-axis data points, Y-axis data points, and Z-axis data points are obtained at resolutions of between approximately 100 nanometers and approximately 100 micrometers.

For example, in some embodiments, suitable optical scanners 24 which optically identify fiducial markers 12 in three dimensions may be utilized. FIG. 6 illustrates an exemplary embodiment of an optical scanner 24 in accordance with the present disclosure, wherein the scanner is a structured light scanner. Structured light scanners generally emit light 28 from an included emitter such as light-emitting diodes 30 or other suitable light generating apparatus. In exemplary embodiments, the emitted light 28 utilized by a structured light scanner is blue light or white light. In general, the emitted light 28 is projected onto the passive strain indicator 40 and component 10 generally in a particular pattern. When the light 28 contacts the passive strain indicator 40 and component 10, the surface contour of the passive strain indicator 40 and fiducial markers 12 distorts the light 28. This distortion may be captured by a detector after the structured light is reflected by the exterior surface, e.g., in an image taken by a camera 32. The image of the light 28 contacting the fiducial markers 12 (and surrounding front surface 17) is received by, for example, the processor 26. The processor 26 then calculates X-axis data points, Y-axis data points, and Z-axis data points based on the received images by, for example, comparing the distortions in the light pattern to the expected pattern. Notably, in exemplary embodiments the processor 26 operates such optical scanners 24 to perform various above disclosed steps.

Alternatively, other suitable data acquisition devices may be utilized. For example, in some embodiments, device 24 is a laser scanner. Laser scanners generally include lasers which emit light in the form of laser beams towards objects, such as in these embodiments fiducial markers 12 and turbine components 10 generally. The light is then detected by a sensor of the device 24. For example, in some embodiments, the light is then reflected off of surfaces which it contacts, and received by a sensor of the device 24. The round-trip time for the light to reach the sensor is utilized to determine measurements along the various axes. These devices are typically known as time-of-flight devices. In other embodiments, the sensor detects the light on the surface which it contacts, and determines measurements based on the relative location of the light in the field-of-view of the sensor. These devices are typically known as triangulation devices. X-axis, Y-axis and Z-axis data points are then calculated based on the detected light, as mentioned. Notably, in exemplary embodiments processor 26 performs and operates such data acquisition devices 24 to perform various above disclosed steps.

In some embodiments, the light emitted by a laser is emitted in a band which is only wide enough to reflect off a portion of object to be measured, such as the plurality of fiducial markers 12. In these embodiments, a stepper motor or other suitable mechanism for moving the laser may be utilized to move the laser and the emitted band as required until light has been reflected off of the entire object to be measured.

Still further, other suitable three-dimensional data acquisition devices 24 may be utilized. Alternatively, however, the present disclosure is not limited to the use of three-dimensional data acquisition devices 24. For example, other suitable devices include electrical field scanners, which may include for example an eddy current coil, a Hall Effect probe, a conductivity probe, and/or a capacitance probe.

Figure 11:
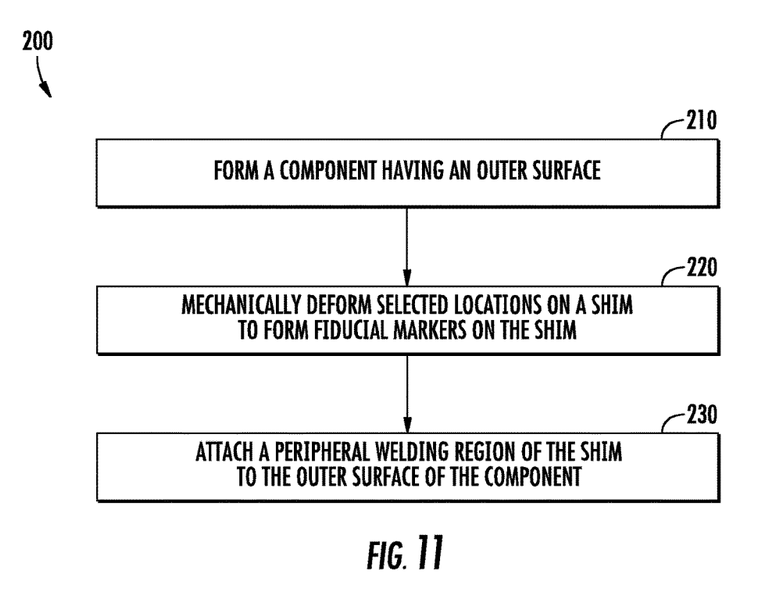
FIG. 11 is a flow chart illustrating a method of making a component with a passive strain indicator in accordance with embodiments of the present disclosure.

Referring now to FIG. 11, an exemplary method 200 of making a component 10 with a passive strain indicator 40 is illustrated. The method 200 includes the step 210 of forming the component 10 with an outer surface 14. The method 200 further includes step 220 of forming the passive strain indicator 40, where the passive strain indicator 40 includes shim 38 with a plurality of fiducial markers 12 thereon, and forming the passive strain indicator 40 includes forming the plurality of fiducial markers 12 on the shim 38 by deforming selected locations on the shim 38. For example, in some embodiments, deforming selected locations on the shim 38 may include dot peening the shim 38. As discussed, each fiducial marker 12 may be an indentation defined in the component 10. The method 200 further includes the step 230 of attaching at least a portion 16 of the shim 38 to the outer surface 14 of the component 10. In some embodiments, the shim 38 may be attached to the outer surface 14 of the component 10 by welding. For example, some embodiments may include spot-welding the peripheral attachment region 16 of the shim 38 to the outer surface 14 of the component 10.

Further, the passive strain indicator 40 may be transferable, that is, step 210 of forming the component 10 and step 220 of forming the passive strain indicator 40 may be performed separately prior to attaching at least a portion of the shim 38 to the outer surface 14 of the component 10, such that the passive shim indicator 40 may be formed separately in time and/or space from when and where the component 10 is formed, and the passive strain indicator 40 may then be transferred to the component 10. This may advantageously permit forming the passive strain indicator 40 under the most efficient conditions for doing so without being constrained by requirements for forming the component 10.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of making a component with a passive strain indicator, the method comprising:
    forming the component, the component comprising an outer surface;
    forming a shim into the passive strain indicator, the passive strain indicator comprising the shim and a plurality of fiducial markers on the shim, the plurality of fiducial markers formed on the shim by deforming selected locations on the shim; and
    attaching at least a portion of the shim to the outer surface of the component;
    wherein forming the component and forming the passive strain indicator are performed separately prior to attaching at least a portion of the shim to the outer surface of the component, and, wherein the plurality of fiducial markers are arranged in a predetermined pattern; and,
    wherein the predetermined pattern comprises an analysis region, a locator region, and a serial region, and wherein at least one of the plurality of fiducial markers is formed in each of the analysis region, the locator region, and the serial region.

2. The method of claim 1, wherein the predetermined pattern includes binary-encoded data.

3. The method of claim 1, wherein deforming selected locations on the shim comprises dot peening.

4. The method of claim 1, wherein deforming selected locations on the shim comprises forming indentations in selected locations on a front surface of the shim.

5. The method of claim 4, wherein the front surface of the shim comprises a reference portion and a peripheral welding region, and wherein deforming selected locations on the shim comprises deforming selected locations within the reference portion.

6. The method of claim 5, wherein, the peripheral welding region is distinct from the reference portion, no fiducial markers are formed on the peripheral welding region, and attaching at least a portion of the shim to the outer surface of the component comprises spot welding only the peripheral welding region of the shim to the outer surface of the component.

7. The method of claim 6, wherein the shim defines a length and a width, the product of the length and the width defines an area of the front surface, and the reference portion occupies between about forty percent of the area of the front surface and about seventy percent of the area of the front surface.

8. The method of claim 7, wherein the peripheral welding region occupies between about thirty percent of the area of the front surface and about sixty percent of the area of the front surface.

9. The method of claim 1, wherein the shim defines a length and a width, the length of the shim is between about two tenths of an inch and about one and a half inches and the width of the shim is between about one tenth of an inch and about three quarters of an inch.

10. A system for monitoring strain, comprising:
    a component comprising an outer surface; and
    a passive strain indicator formed on a shim, at least a portion of the passive strain indicator integrally joined with the outer surface of the component, the passive strain indicator comprising the shim and a plurality of fiducial markers, each fiducial marker of the plurality of fiducial markers comprising a discrete three-dimensional feature formed on the shim, and wherein the plurality of fiducial markers are arranged in a predetermined pattern, wherein the predetermined pattern comprises an analysis region, a locator region, and a serial region, and wherein at least one of the plurality of fiducial markers is positioned in each of the analysis region, the locator region, and the serial region.

11. The system of claim 10, wherein the predetermined pattern includes binary-encoded data.

12. The system of claim 10, wherein each fiducial marker comprises an indentation in a front surface of the shim.

13. The system of claim 10, wherein the shim comprises:
    a front surface, the plurality of fiducial markers formed in a reference portion of the front surface of the shim;

a peripheral attachment region on the front surface, the peripheral attachment region distinct from the reference portion and integrally joined to the outer surface of the component; and wherein no fiducial markers are formed on the peripheral attachment region.

14. The system of claim 13, wherein the shim defines a length and a width, the product of the length and the width defines an area of the front surface, and the reference portion occupies between about forty percent and about seventy percent of the area of the front surface.

15. The system of claim 14, wherein the peripheral attachment region occupies between about thirty percent of the area of the front surface and about sixty percent of the area of the front surface.

16. The system of claim 10, wherein the shim defines a length and a width, the length of the shim is between about two tenths of an inch and about one and a half inches and the width of the shim is between about one tenth of an inch and about three quarters of an inch.

17. A method of making a passive strain indicator on a component, the method comprising:

forming a shim into the passive strain indicator, the passive strain indicator comprising the shim and a plurality of fiducial markers on the shim, the plurality of fiducial markers formed on the shim by deforming selected locations on the shim; and attaching at least a portion of the shim to an outer surface of the component;

wherein forming the passive strain indicator is performed separately prior to attaching at least a portion of the shim to the outer surface of the component, and wherein the plurality of fiducial markers are arranged in a predetermined pattern, wherein the predetermined pattern comprises an analysis region, a locator region, and a serial region, and wherein at least one of the plurality of fiducial markers is positioned in each of the analysis region, the locator region, and the serial region.

18. The method of claim 17, wherein the predetermined pattern includes binary-encoded data.

19. The method of claim 17, wherein deforming selected locations on the shim comprises dot peening.

20. The method of claim 17, wherein deforming selected locations on the shim comprises forming indentations in selected locations on a front surface of the shim.

21. The method of claim 20, wherein the front surface of the shim comprises a reference portion and a peripheral welding region, and wherein deforming selected locations on the shim comprises deforming selected locations within the reference portion.

22. The method of claim 21, wherein the peripheral welding region is distinct from the reference portion, no fiducial markers are formed on the peripheral welding region, and attaching at least a portion of the shim to the outer surface of the component comprises spot welding only the peripheral welding region of the shim to the outer surface of the component.

23. The method of claim 22, wherein the shim defines a length and a width, the product of the length and the width defines an area of the front surface, and the reference portion occupies between about forty percent of the area of the front surface and about seventy percent of the area of the front surface.

24. The method of claim 23, wherein the peripheral welding region occupies between about thirty percent of the area of the front surface and about sixty percent of the area of the front surface.

25. The method of claim 17, wherein the shim defines a length and a width, the length of the shim is between about two tenths of an inch and about one and a half inches and the width of the shim is between about one tenth of an inch and about three quarters of an inch.

* * * * *